(12) United States Patent
Bennett et al.

(10) Patent No.: US 12,536,341 B2
(45) Date of Patent: Jan. 27, 2026

(54) SECURITY TECHNIQUE FOR DIGITAL DATA ON DIGITAL STORAGE MEDIUM

(71) Applicant: INTERNATIONAL BUSINESS MACHINES CORPORATION, Armonk, NY (US)

(72) Inventors: Jennifer I. Bennett, Rochester, MN (US); William J Green, Cary, NC (US); Jeremy Miner, Cary, NC (US); Carolina Garcia Delgado, Zapopan (MX)

(73) Assignee: International Business Machines Corporation, Armonk, NY (US)

(*) Notice: Subject to any disclaimer, the term of this patent is extended or adjusted under 35 U.S.C. 154(b) by 212 days.

(21) Appl. No.: 18/062,038

(22) Filed: Dec. 6, 2022

(65) Prior Publication Data
US 2024/0184930 A1 Jun. 6, 2024

(51) Int. Cl.
*G06F 21/78* (2013.01)
*G01R 11/24* (2006.01)
(Continued)

(52) U.S. Cl.
CPC ............ *G06F 21/78* (2013.01); *G06F 1/3268* (2013.01); *G01R 11/24* (2013.01); *G06F 1/18* (2013.01);
(Continued)

(58) Field of Classification Search
CPC ...... H05K 9/0067; G01R 11/24; H02B 1/063; G06F 1/18; G06F 21/554
See application file for complete search history.

(56) References Cited

U.S. PATENT DOCUMENTS 4,096,560 A * 6/1978 Footh .................. G06F 1/24
365/228
5,517,177 A * 5/1996 Cantrall ............... A45C 13/24
340/693.9
(Continued)

FOREIGN PATENT DOCUMENTS

CN 105426784 A 3/2016
WO 2002095550 A2 11/2002

OTHER PUBLICATIONS

"Automatic Data Migration Within a Tiered Secure Environment", An IP.com Prior Art Database Technical Disclosure, IP.com No. IPCOM000267693D, IP.com Electronic Publication Date: Nov. 15, 2021, 6 pages.
(Continued)

*Primary Examiner* — William R Korzuch
*Assistant Examiner* — Aditya Sriram
(74) *Attorney, Agent, or Firm* — Michael A. Petrocelli

(57) ABSTRACT

Digital data stored on a data storage device is secured by rendering the data storage device inoperable. An insulating tab can be coupled to a battery where the insulating tab is positioned between an electric output for the battery and a power circuit for the data storage device. The insulating tab can be positioned between the data storage device and a structure, such that when the structure is compromised to access the storage device, the insulating tab is decoupled from the battery and an electric output at a voltage level is delivered by the battery to the storage device via the power circuit. The voltage level renders the storage device inoperable by providing an overvoltage to one or more electrical components of the storage device.

17 Claims, 6 Drawing Sheets

(51) Int. Cl.
  *G06F 1/3234* (2019.01)
  *G06F 21/55* (2013.01)
  *H02B 1/06* (2006.01)
  *H05K 3/30* (2006.01)
  *G06F 1/18* (2006.01)
  *H05K 9/00* (2006.01)

(52) U.S. Cl.
  CPC ............ *G06F 21/554* (2013.01); *H02B 1/063* (2013.01); *H05K 3/30* (2013.01); *H05K 9/0067* (2013.01)

(56) References Cited

U.S. PATENT DOCUMENTS

| | | | |
|---|---|---|---|
| 9,928,386 B1 | 3/2018 | Gardner | |
| 10,209,090 B2 | 2/2019 | Luke | |
| 10,681,542 B2 | 6/2020 | Luke | |
| 11,068,389 B2 | 7/2021 | Gao | |
| 2008/0174973 A1* | 7/2008 | Tanaka | H05K 9/0084 361/736 |
| 2011/0048756 A1* | 3/2011 | Shi | H05K 7/00 174/50 |
| 2012/0151121 A1* | 6/2012 | Braga | G06F 21/79 711/E12.008 |
| 2014/0263216 A1 | 9/2014 | Clark | |
| 2015/0156876 A1* | 6/2015 | Bang | H05K 3/10 174/261 |
| 2015/0236332 A1* | 8/2015 | Bennett | H01M 50/593 429/97 |
| 2017/0025365 A1* | 1/2017 | Tin | H01L 23/576 |
| 2017/0215699 A1* | 8/2017 | Ouyang | A61B 1/00045 |

OTHER PUBLICATIONS

"Dedicated processor core to detect and prevent security threats", An IP.com Prior Art Database Technical Disclosure, IP.com No. IPCOM000222433D, IP.com Electronic Publication Date: Oct. 5, 2012, 3 pages.
"H300/H350 User Guide", DataLocker Inc., Apr. 2021, 24 pages.
"Securing highly classified data in any environment", Secure Systems, Printed Nov. 29, 2022, 1 page, <www.securesystems.com.au>.
"System and Method to achieve Process private data security", An IP.com Prior Art Database Technical Disclosure, IP.com No. IPCOM000214711D, IP.com Electronic Publication Date: Feb. 3, 2012, 10 pages.
Alder, Steve, "Hard Drive Theft Sees Data of 1 Million Individuals Exposed", HIPAA Journal, Jun. 23, 2017, 3 pages.
Lee, Demi, "A thief stole unencrypted hard drives filled with 29,000 Facebook employees' information / Via car break-in", The Verge, Dec. 13, 2019, 5 pages, <https://www.theverge.com/2019/12/13/21020736/facebook-theft-unencrypted-drives-employee-payroll-security>.
Intel Hardware Shield—Intel Total Memory Encryption White Paper, Retrieved from: https://www.intel.com/content/www/us/en/architecture-and-technology/vpro/hardware-shield/total-memory-encrpytion.html, Nov. 29, 2022, 3 pages.

* cited by examiner

SECURITY TECHNIQUE FOR DIGITAL DATA ON DIGITAL STORAGE MEDIUM

BACKGROUND

The present disclosure relates to techniques for securing digital data stored on a digital data storage medium such as a computer readable storage medium, by rendering the data storage medium inoperable.

Some examples of data storage device include hard disk drives, solid state drives, server assemblies and other types of storage devices. Increased use of data storage can also increase risk of a data breach. For example, data storage devices are vulnerable to theft and physical access from malicious entities. Such breaches can occur during shipment, relocation, or removal from a storage or usage facility.

In one example, a storage medium can be removed and the device could be plugged into another system, and thereby sensitive information could be accessed. Theft of storage mediums can affect many people when, for example, a database of sensitive personal data is compromised.

Currently, in one example, warning systems can alert security to unauthorized removal of a device, however, in one example, such a warning system does not prevent the actual removal of devices nor access to data once a device is removed.

SUMMARY

The present disclosure recognizes the shortcomings and problems associated with current techniques for techniques for securing digital data on a digital storage medium such as a computer readable storage medium.

Embodiments according to the present invention can include techniques for securing digital data on a digital data storage medium such as a computer readable storage medium by rendering the computer readable storage medium, such as a computer hardware data storage device, inoperable.

Embodiment of the disclosure provide a security mechanism that protects a storage medium from unauthorized access. The security mechanism utilizes a passive battery, affixed to a printed circuit board (PCB) or hard drive device. The battery can deliver a catastrophic voltage to the memory storage device when the storage medium is removed from its operating system so that the sensitive data cannot be accessed.

In an aspect according to the present invention, a method for securing digital data stored on a data storage device by rendering the data storage device inoperable includes coupling an insulating tab to a battery, and the insulating tab is positioned between an electric output for the battery and a power circuit for the data storage device. The method includes positioning the insulating tab between the data storage device and a structure, such that when the structure is compromised to access the storage device, the insulating tab is decoupled from the battery and an electric output at a voltage level is delivered by the battery to the storage device via the power circuit, rendering the storage device inoperable by providing an overvoltage to one or more electrical components of the storage device.

In a related aspect, the power circuit is electrically communicable with the one or more electrical components of the data storage device.

In a related aspect, the method further includes coupling the battery to the data storage device, and the battery is electrically communicable with the data storage device and the one or more electrical components, at least in part via the power circuit, for providing electrical power to the data storage.

In a related aspect, the power circuit electrically communicates with a power source for the data storage device and the one or more electrical components.

In a related aspect, the method incudes coupling the data storage device to a chassis, at least in part as the structure, such that the insulating tab is between the electric output for the battery and the power circuit for the storage device.

In a related aspect, the method further includes coupling the insulating tab to the chassis.

In a related aspect, the chassis encases, at least partially, the data storage device.

In a related aspect, the data storage device is coupled to a PCB (Printed Circuit Board).

In a related aspect the method further includes coupling a chassis as the structure to a bottom of a PCBA (Printed Circuit Board Assembly) where the PCBA includes the data storage device, the insulating tab and the battery being between the data storage device and the chassis.

In a related aspect, the method further including a computer system managing the electrical output of the battery and selectably initiating the electric output.

In a related aspect, the method further includes detecting, at the computer system, a loss of contact between the data storage device and the structure; and in response to the detecting, initiating a voltage input to the data storage device at the voltage level via the power circuit.

In a related aspect, the method further includes detecting, at the computer system, a loss of contact between a PCBA including the data storage device and a chassis as the structure; and in response to the detecting, initiating a voltage input to one or more electrical components of the data storage device via the power circuit at the voltage level.

In another aspect according to the present invention, a system for securing digital data stored on a data storage device by rendering the data storage device inoperable includes an insulating tab coupled between an electric output for a battery and a power circuit for a data storage device. The insulating tab is positioned between the data storage device and a structure, such that when the structure is compromised to access the data storage device, the insulating tab is decoupled from the battery and an electric output at a voltage level is delivered by the battery to the storage device via the power circuit, rendering the storage device inoperable by providing an overvoltage to one or more electrical components of the storage device.

In a related aspect, the system further includes coupling the data storage device to a chassis, at least in part as the structure, such that the insulating tab is between the electric output for the battery and the power circuit for the storage device.

In a related aspect, the system further includes coupling the insulating tab to the chassis.

In a related aspect, the chassis encases, at least partially, the data storage device.

In a related aspect, the data storage device is coupled to a PCB (Printed Circuit Board).

In a related aspect, the system further includes coupling a chassis as the structure to a bottom of a PCBA (Printed Circuit Board Assembly) where the PCBA includes the data storage device, the insulating tab and the battery being between the data storage device and the chassis.

In another aspect according to the present invention, a system for securing digital data stored on a data storage device by rendering the data storage device inoperable which comprises: a computer system. The computer system comprising; a computer processor, a computer-readable storage medium, and program instructions stored on the computer-readable storage medium being executable by the processor, to cause the computer system to perform the following functions to; deliver an electric output at a voltage level to a data storage device via a power circuit, rendering the data storage device inoperable by providing an overvoltage to one or more electrical components of the data storage device, in response to the structure being compromised to access the data storage device, and a loss of contact between the data storage device and the structure.

In a related aspect, the system further includes a chassis coupled to the data storage device, at least in part as the structure, such that an insulating tab is between an electric output for a battery and the power circuit for the storage device; and the program instruction of the computer cause the function to remove the insulating tab.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1A:
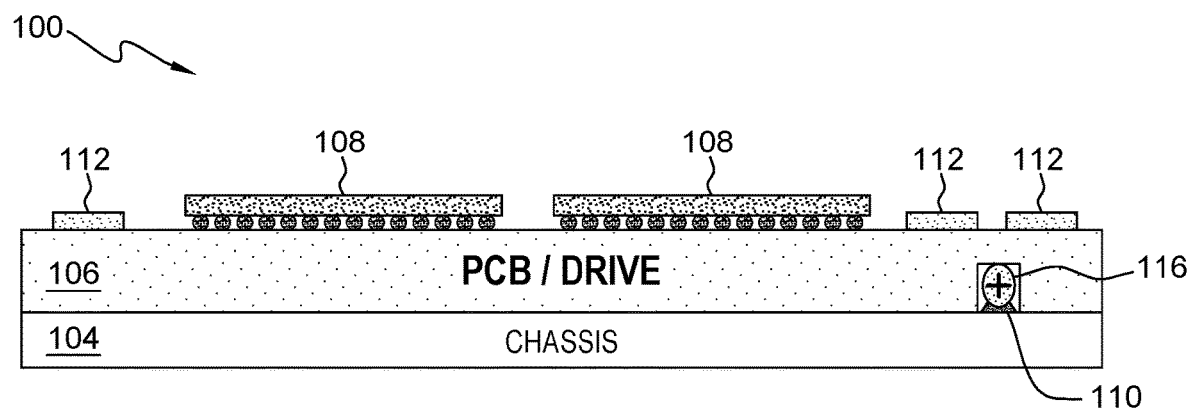
FIG. 1A is a cross sectional side elevational view of a system which includes a structure or base embodied as a chassis, printed circuit board (PCB), and a battery and insulation tab coupled to the board, according to an embodiment of the present disclosure, for securing digital data stored on a data storage device by rendering the data storage device inoperable.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

It is understood that a user can be an individual, or a group of individuals, or a company or an organization, or an entity.

Embodiments of the present disclosure include application to a storage medium, encryption card, or high value asset such as a hard drive or printed circuit board. A battery is passively incorporated into the storage device. The battery is activated when the storage medium is removed from its operating system. In one example, an insulating tab protects the battery, maintaining an inactive state, until the storage medium is removed from its operating system. The insulating tab can be affixed to the device's mechanical hardware, or connector, or mechanical screw. When the storage medium is removed, the insulated tab is separated from the battery and the battery delivers a catastrophic voltage. This results in irreparable damage to the storage medium device, but ensures that the data is not compromised, that is, accessed by an unauthorized person or entity, or a malicious entity.

In one embodiment according to the present disclosure, a battery is hidden within a digital storage medium. An insulating tab is affixed to a mechanical chassis/hardware between the chassis and a battery. When the storage medium is removed, the insulating tab separates from the battery, and the battery delivers an overvoltage to the memory storage device.

Figure 1B:
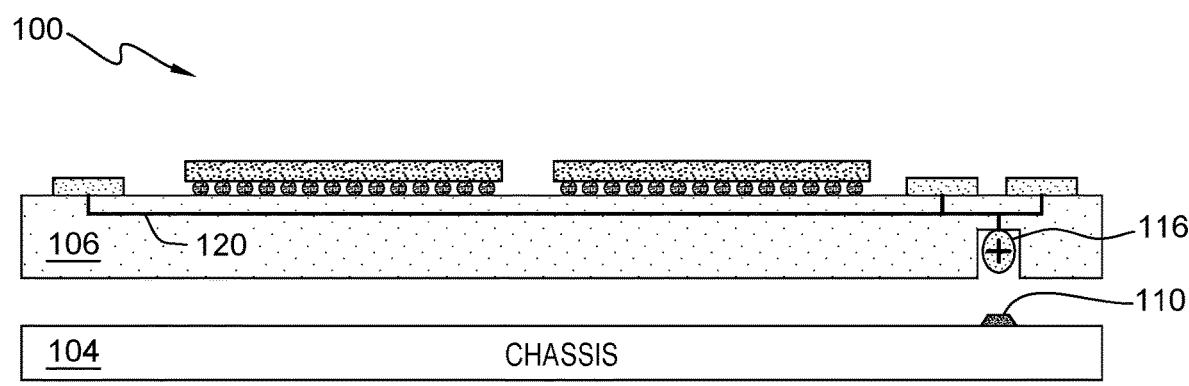
FIG. 1B is a side elevational view of the system shown in FIG. 1A, in operation, with the chassis and insulation tab decoupled from the PCB.

Referring to FIGS. 1A and 1B, according to an embodiment of the present disclosure, digital data stored on a data storage device can be secured by rendering the data storage device inoperable.

Figure 2:
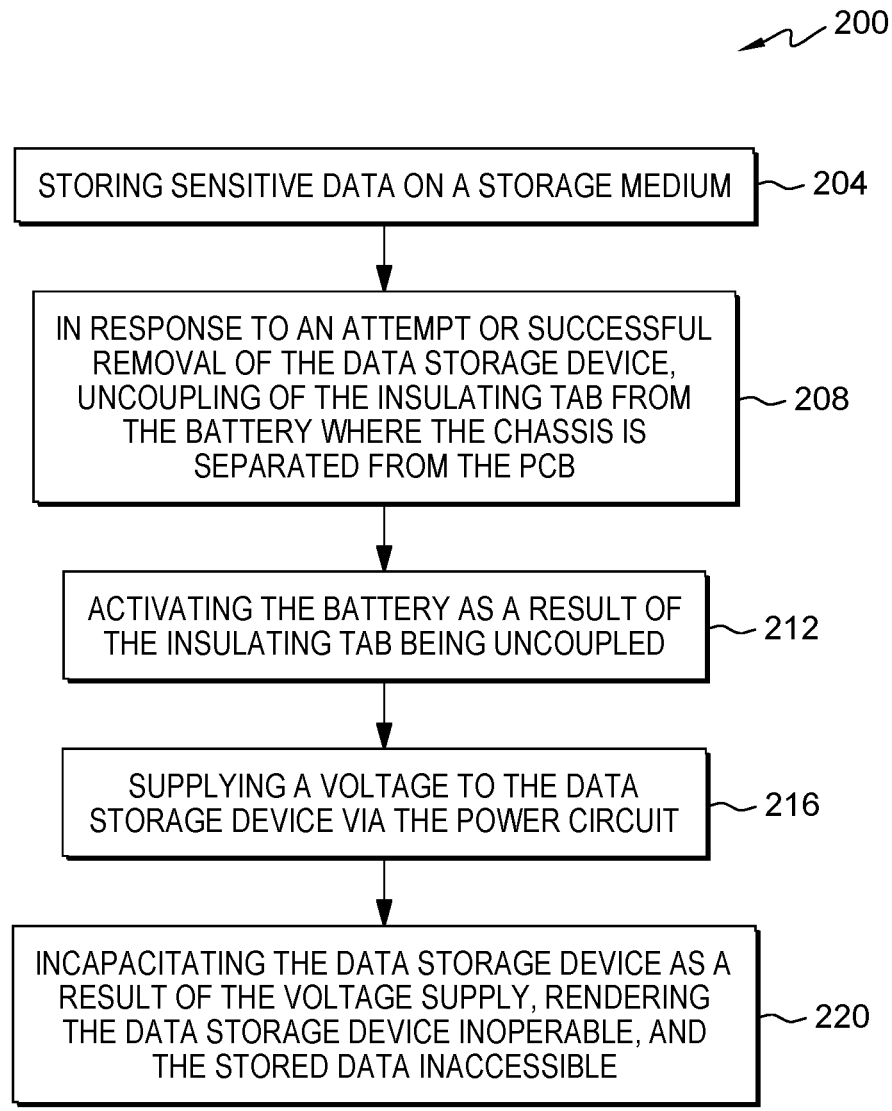
FIG. 2 is a flow chart of a method, according to an embodiment of the present disclosure, which can use the system depicted in FIGS. 1A and 1B, for securing digital data stored on a data storage device by rendering the data storage device inoperable.

Referring to FIG. 1A, a system 100, and associated method 200 of use/operation as shown in FIG. 2, includes a structure embodied as a chassis 104 coupled to a printed circuit board (PCB) 106 or a drive. An insulator tab 110 is positioned between a battery 116 and a PCB 106, and the PCB 106 and the chassis 104. Components are affixed to the printed circuit board. The components can include data storage device 112. Other components can include, for example, transformers, as well as, integrated circuits 108 affixed to the PCB. The data storage devices 112 can be affixed to the printed circuit board and electrically connected to a power source via an electric circuit in the PCB.

Referring to FIG. 1B, in response to the chassis being separated from the PCB, the insulating tab 110 decouples from the battery which is electrically connected to components on the PCB including a data storage device via an electrical circuit 120.

Referring to FIG. 2, the method 200 includes storing sensitive data on a data storage medium such as a data storage device 112, as in block 204. The method includes the insulating tab being uncoupled from the battery in response to an attempt or successful removal of the data storage device where the chassis is separated from the PCB resulting in the insulating tab being uncoupled from the battery, as in block 208.

The method includes activation of the battery in response to the insulating tab being uncoupled from the battery, as in block 212. The activation of the battery can include initiating connectivity of the battery to a power circuit for the data storage device and components of the data storage device.

The method includes the battery supplying a voltage to the data storage device via a power circuit, as in block 216, as a result of the connectivity. The voltage is such that the voltage damages/incapacitates the data storage device and/or data storage device components rendering the data storage device inoperable, and thereby the data stored on the data storage device inaccessible, as in block 220. For example, the voltage is an overvoltage with respect to the data storage device voltage specifications.

Figure 3A:
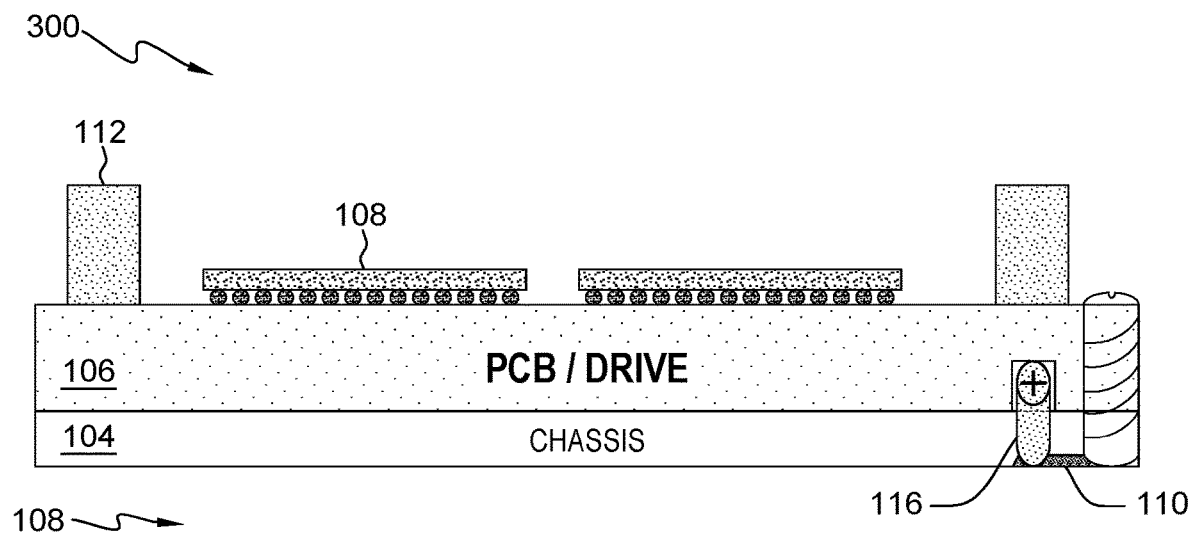
FIG. 3A is a cross sectional side elevational view of a system which includes a structure or base embodied as a chassis, printed circuit board (PCB), and a battery and insulation tab coupled to the board, according to an embodiment of the present disclosure, for securing digital data stored on a data storage device by rendering the data storage device inoperable.

Referring to FIG. 3A, in another embodiment according to the present disclosure, a method for securing digital data stored on a data storage device by rendering the data storage device inoperable includes a PCB 106 including a battery extending between and within the chassis and the PCB. The insulating tab 110 is on a bottom portion internal to the chassis. The function of the insulating tab is similar as the method 200, wherein when the chassis is moved or removed, the insulating tab is decoupled from the battery initiating a voltage from the battery. In one example, decoupling of the insulating tab is initiated in response to releasing or unscrewing a screw holding the chassis to the PCB.

Figure 3B:
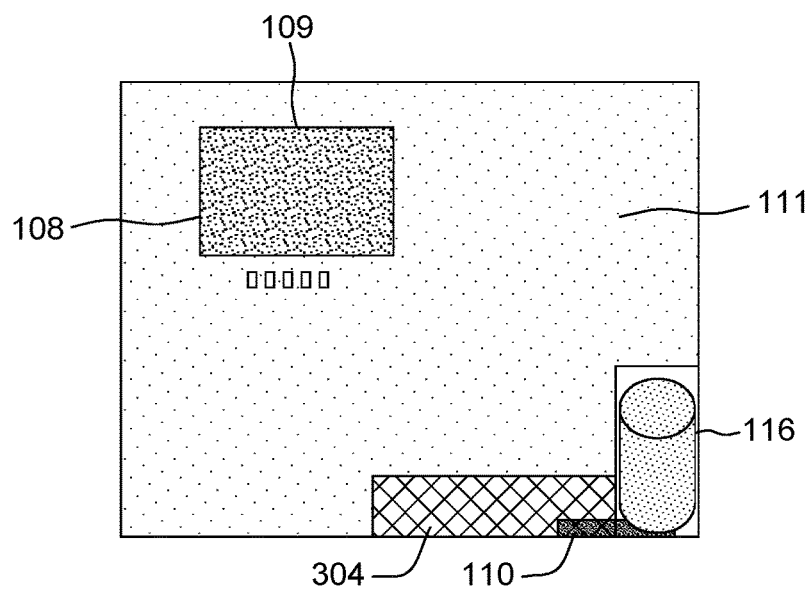
FIG. 3B is a bottom view of the PCB shown in FIG. 3A depicting a battery, connector, and integrated circuit or chip real estate.

Referring to FIG. 3B, in another embodiment according to the present disclosure, a method for securing digital data stored on a data storage device by rendering the data storage device inoperable includes a PCB 106 including an electrical component 304 connected to the PCB using surface-mount technology (SMT), wherein the electrical component 304 is mounted directly onto the surface of a printed circuit board (PCB). The insulating tab 110 is positioned between the component 304 and the battery 116. The bottom 109 of the chip 108 is shown on the bottom 111 of the PCB 106. The function of the insulating tab is similar as the method 200, wherein when the chassis is moved or removed, the insulating table is decoupled from the battery and electrical component initiating a voltage from the battery.

Figure 5:
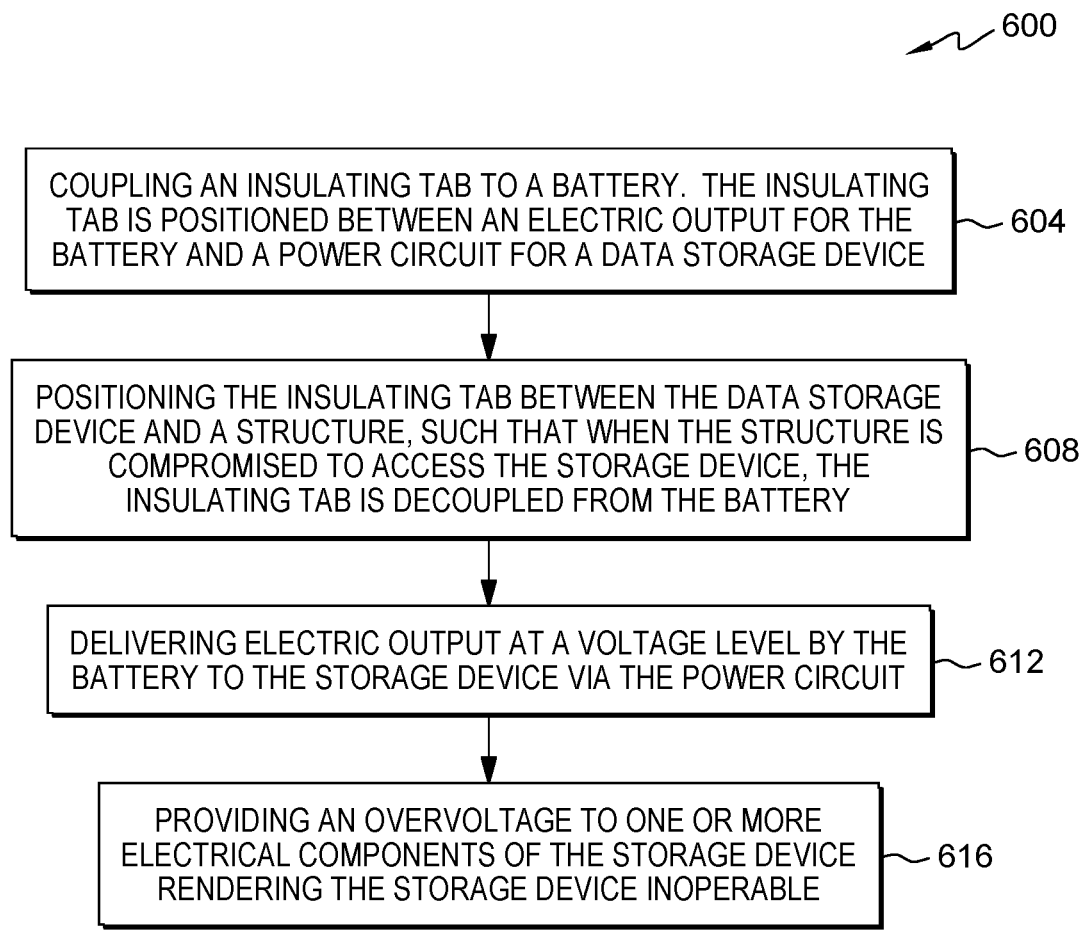
FIG. 5 is a flow chart of a method, according to another embodiment of the present disclosure, which can use the system depicted in FIGS. 1A and 1B, for securing digital data stored on a data storage device by rendering the data storage device inoperable.

Referring to FIGS. 1A, 1B, and FIG. 5 a method 600 according to the present disclosure, for securing digital data stored on a data storage device by rendering the data storage device inoperable includes coupling an insulating tab 110 to a battery 116, as in block 604. The insulating tab is positioned between an electric output for the battery and a power circuit 120 for a data storage device 112, as in block 604, wherein several are shown in FIG. 1A.

The method 600 includes positioning the insulating tab 110 between the data storage device 112 and a structure, such as a chassis 104, as in block 608. When the structure is compromised to access the storage device, which can include moving the data storage device in relation to the structure (such as separating the PCB from the chassis), the insulating tab is decoupled from the battery, as in block 608. An electric output at a voltage level is delivered by the battery to the storage device via the power circuit, as in block 612. The voltage level can be an overvoltage rendered to the data storage device. The electric output renders the storage device inoperable by providing an overvoltage to one or more electrical components of the storage device, as in block 616.

Referring to FIGS. 1A, 1B, another method, according to the present disclosure, for securing digital data stored on a data storage device by rendering the data storage device inoperable includes decoupling an insulating tab from a battery in response to a structure coupled to a data storage device, or a PCB including a data storage device, being compromised to access the storage device. Such compromising of the structure includes, for example, a chassis being separated from a PCB having a data storage device or a data storage device itself.

Continuing, the method includes, in response to the insulating tab being decoupled from the battery, an electric output at a voltage level is delivered by the battery to the storage device via a power circuit for the data storage device, rendering the storage device inoperable by providing an overvoltage to one or more electrical components of the storage device.

Figure 4:
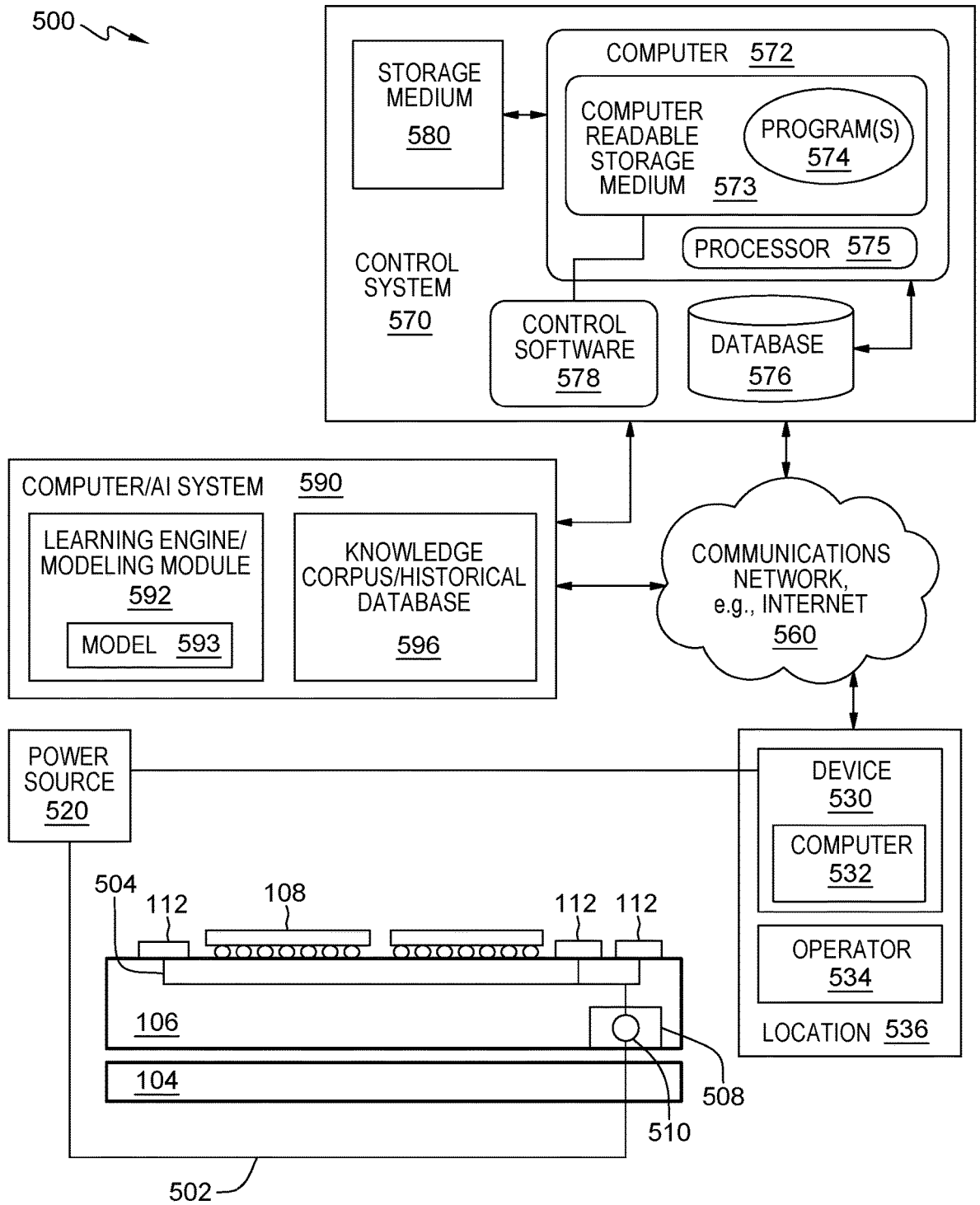
FIG. 4 is a schematic block diagram illustrating, according to another embodiment of the present disclosure, a system for securing digital data stored on a data storage device by rendering the data storage device inoperable.

Referring to FIGS. 4 and 5, according to another embodiment of the present disclosure, a system 500, and associated computer implemented method 600 of operation, can be used to for securing digital data stored on a data storage device by rendering the data storage device inoperable. Similar components have the same reference numbers as the system 100 shown in FIGS. 1A and 1B. In one example, the power circuit can be electrically communicable with the one or more electrical components of the data storage device.

In another example, the method can further include coupling the battery to the data storage device. The battery can be electrically communicable with the data storage device and the one or more electrical components, at least in part via the power circuit, for providing electrical power to the data storage.

In another example, the power circuit electrically communicates with a power source for the data storage device and the one or more electrical components.

In another example, the method can include coupling the data storage device to a chassis, at least in part as the structure, such that the insulating tab is between the electric output for the battery and the power circuit for the storage device.

In another example, the method can include coupling the insulating tab to the chassis.

In another example, the chassis encases, at least partially, the data storage device.

In another example, the data storage device is coupled to a PCB (Printed Circuit Board).

In another example, the method includes coupling a chassis as the structure to a bottom of a PCBA (Printed Circuit Board Assembly) where the PCBA includes the data storage device, the insulating tab and the battery being between the data storage device and the chassis.

In another example, the method further includes a computer system managing the electrical output of the battery and selectably initiating the electric output.

In another example, the method further includes detecting, at the computer system, a loss of contact between the data storage device and the structure. The method includes in response to the detecting, initiating a voltage input to the data storage device at the voltage level via the power circuit.

In another example, the method further includes detecting, at the computer system, a loss of contact between a PCBA including the data storage device and a chassis as the structure. The method further includes in response to the detecting, initiating a voltage input to one or more electrical components of the data storage device via the power circuit at the voltage level.

In another example, the computer could initiate the removal of an insulating tab coupled between an electrical output for a battery and the power circuit for the data storage device, thereby decoupling the insulating tab from the battery. In one example, the computer can initiate mechanically removing the tab, or in another example, releasing a chemical to dissolve the tab. Or in another example, an electrical circuit gate can be employed to close a circuit to allow current to flow from the battery to one or more components of the data storage device. The circuit can remain open thereby not allowing electrical current to flow until the circuit is closed.

Referring to FIG. 4, the system includes a PCB 106 and a chassis 104 shown in a detached position from the PCB. Within the PCB is a power component 508 including a voltage junction 510. An electrical circuit 504 supplies electrical power to components 112 from the power component 508. The voltage junction 510 of the electrical circuit includes a voltage input 502 provided by the power source 520, and the PCB power circuit 504. The voltage junction 510 can include a power supply 520 which is initiated using a computer 532, or a power regulator component to regulate the voltage from the power source, or similarly a junction component can receive a voltage from the power source.

The computer 532 can be part of a device 530 and used by an operator 534 at a location 536. The apparatus PCB 106 can electrically communicate with the power source 520. The operator 534, or using automation, at a location 536 can also manage, in all or in part, operation of initiating the voltage at the voltage junction 510. For example, the voltage junction can include a battery to deliver the voltage, or the voltage can derive from a power source. The controlling of the operations can be initiated and implemented, in all or in part, using a computer or artificial intelligence (AI), in one or combinations and/or in all or in part. The computer and/or AI can generate an automated system, in all or in part, for securing digital data stored on a data storage device by rendering the data storage device inoperable.

The system 500, in one example, can include a control system 570 which can include a computer 572 of the system which can communicate with the user device 530 for use by an operator 534 located at a location 536. The computer 532 can communicate, in all or in part, with the control system computer 572. The control system can include the computer 572 having a computer readable storage medium 573 which can store one or more programs 574, and a processor 575 for executing program instructions, and can also include control software 578 for managing the one or more programs. The control system can also include a storage medium 580 which can include registration and/or account data if needed. Program code can be executed by a processor 575. The computer 572 can communicate with a database 576 for storing all or part of data.

The device 530 and/or a user device can also communicate with a communications network 560, for example, the Internet. In one example, a remote computer/AI (Artificial Intelligence) system 590 and the control system 570 can communicate with the device via the network 560.

In one or more examples, the computer 532 can be used to control or manage the voltage level, including providing an overvoltage to one or more components of an electrical circuit, using the power source. In another example, the computer can control removal of an insulating tab from between a battery and the circuit 504. Such removal can be electronically initiated and include mechanical removal or chemical removal of the insulating tab.

In another embodiment according to the present disclosure, a system for securing digital data stored on a data storage device or a digital storage medium, by rendering the data storage device inoperable includes an insulating tab coupled between an electric output for a battery and a power circuit for a data storage device. For example, a battery can electrically communicate with a data storage device. The insulating tab is positioned between the data storage device and a structure, such that when the structure is compromised to access the data storage device, the insulating tab is decoupled from the battery and an electric output at a voltage level is delivered by the battery to the storage device via the power circuit. The electric output renders the storage device inoperable by providing an overvoltage to one or more electrical components of the storage device. For example, compromising the structure can include the structure being moved in relation to the data storage device such that the data storage device can be removed from the structure or a PCB housed by the structure.

The system can further include coupling the data storage device to a chassis, at least in part as the structure, such that the insulating tab is between the electric output for the battery and the power circuit for the storage device.

The system can further include coupling the insulating tab to the chassis. In another example, the chassis encases, at least partially, the data storage device. In another example, the data storage device is coupled to a PCB (Printed Circuit Board). The system can include coupling a chassis as the structure to a bottom of a PCBA (Printed Circuit Board Assembly) where the PCBA includes the data storage device, the insulating tab and the battery being between the data storage device and the chassis.

In another embodiment according to the present disclosure, system for securing digital data stored on a data storage device by rendering the data storage device inoperable includes a computer system. The computer system comprises a computer processor, a computer-readable storage medium, and program instructions stored on the computer-readable storage medium being executable by the processor, to cause the computer system to perform the following functions. A function to deliver an electric output at a voltage level to a storage device via a power circuit, rendering the storage device inoperable by providing an overvoltage to one or more electrical components of the storage device, in response to the structure being compromised to access the data storage device, and a loss of contact between the data storage device and the structure.

In one example, the system further includes a chassis coupled to the data storage device, at least in part as the structure, such that an insulating tab is between an electric output for a battery and the power circuit for the storage device; and the program instruction of the computer cause the function to remove the insulating tab.

In another example, a method or system according to the present disclosure, can render a computer hardware data storage device inoperable for data security and protection. The method or system can include coupling a battery to a computer hardware data storage device. The battery can be electrically communicable with the storage device for providing electrical power to the storage device via a power circuit on the storage device, and the electrical power can be sufficient voltage to render the storage device inoperable. The method and system can include coupling an insulating tab on the chassis and positioning the insulating tab between an electric output for the battery and the power circuit for the storage device. The method and system can include coupling the computer hardware data storage device to the chassis such that the insulating tab is between the electric output for the battery and the power circuit for the storage device, such that when the storage device is removed from the chassis, the insulating tab is removed and an electric output is delivered by the battery to the storage device via the power circuit that renders the storage device inoperable thereafter.

In another example according to the present disclosure, a method for securing digital data by rendering a computer hardware data storage device or digital storage medium inoperable includes coupling a battery to a computer hardware data storage device. The battery is electrically communicable with the storage device for providing electrical power to the storage device via a power circuit on the storage device which electrically communicates with electrical components of the storage device. The electrical power provides voltage at a voltage level rendering the storage device inoperable by providing an overvoltage to one or more of the electrical components of the storage device. The method includes coupling an insulating tab to the battery between an electric output for the battery and the power circuit for the storage device. The method includes coupling the computer hardware data storage device to the chassis such that the insulating tab is between the electric output for the battery and the power circuit for the storage device. The method includes positioning the insulating tab also between the data storage device and a chassis, such that when the storage device is removed from the chassis, the insulating tab is decoupled from the battery and an electric output at the voltage level is delivered by the battery to the storage device via the power circuit which renders the storage device inoperable thereafter by providing the overvoltage to the one or more of the electrical components.

In another embodiment according to the present disclosure, a computer program product for securing digital data stored on a data storage device by rendering the data storage device inoperable. The computer program product includes a computer readable storage medium having program instructions embodied therewith, the program instructions executable by a computer to cause the computer to perform functions, by the computer, comprising the following functions. A function to deliver an electric output at a voltage level to a storage device via a power circuit, rendering the storage device inoperable by providing an overvoltage to one or more electrical components of the storage device, in response to the structure being compromised to access the data storage device, and a loss of contact between the data storage device and the structure.

In one example, a method can further include generating a digital model, using a computer, where the digital model simulates the function of delivering an electric output at a voltage level to a data storage device via a power circuit which renders the storage device inoperable by providing an overvoltage to one or more electrical components of the storage device. connecting of the plurality of battery pack in the circuit in the battery system. Further, the digital model simulates the function of discharging of the electrical capacity of remaining cells in the battery pack in response to the detecting when the cell meets the threshold of the thermal state. The method further includes iteratively generating the digital model to produce updated models.

Other Embodiments and Examples

In one example, the delivery system 520 can include a computer 522 including a processor 524 and a computer readable storage medium 526 where an application 528 can be stored which can in one example, embody all or part of the method of the present disclosure. The application can include all or part of instructions to implement the method of the present disclosure, embodied in code and stored on a computer readable storage medium. The computer and/or device can include a display. The computer 522 can operate, in all or in part, in conjunction with a remote server by way of a communications network 560, for example, the Internet.

In one example, an application can include all or part of instructions to implement the method of the present disclosure, embodied in code and stored on a computer readable storage medium. The computer and/or device can include a display. The computer 532 can operate, in all or in part, in conjunction with a remote server by way of a communications network 560, for example, the Internet. The system 500 can include received data, as well as have access to a historical database or knowledge corpus 596.

Additional Examples and Embodiments

The control system can also communicate with a computer system which can include a learning engine/module and a knowledge corpus or database. The computer system can also communicate with the computer of the device and can be remote from the user device. In another example, the computer system can be all or part of the control system, or all or part of the device. The depiction of the computer system as well as the other components of the system are shown as one example according to the present disclosure. One or more computer systems can communicate with a communications network, e.g., the Internet. For example, the computer, and the control system can communicate with the communications network, and the device/computer can communicate with a local communications network which can communicate with the communications network.

In one example, a new or different AI (Artificial Intelligence) ecosystem, or technology/communication or IT (Information Technology) ecosystem can include a local communications network which can communicate with the communications network 560. The system 500 can include a learning engine/module 592, which can be at least part of the control system or communicating with the control system, for generating a model 593 or learning model. In one example, the learning model can model workflow in a new AI or IoT (Internet of Things) ecosystem for machine/devices in the new ecosystem.

In another example, a computer can be part of a device. The computer can include a processor and a computer readable storage medium where an application can be stored which can in one example, embody all or part of the method of the present disclosure. The application can include all or part of instructions to implement the method of the present disclosure, embodied in code and stored on a computer readable storage medium. The device can include a display. The device can operate, in all or in part, in conjunction with a remote server by way of a communications network, for example, the Internet.

The method can include an analysis generating a model 593 based on received data. A model can also be generated by an AI system, at least in part. In one example, an AI system can generate a model using an AI system analysis using machine learning.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

More Examples and Embodiments

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to return to a previous operation or proceed as directed, for example as represented by an operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database. The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
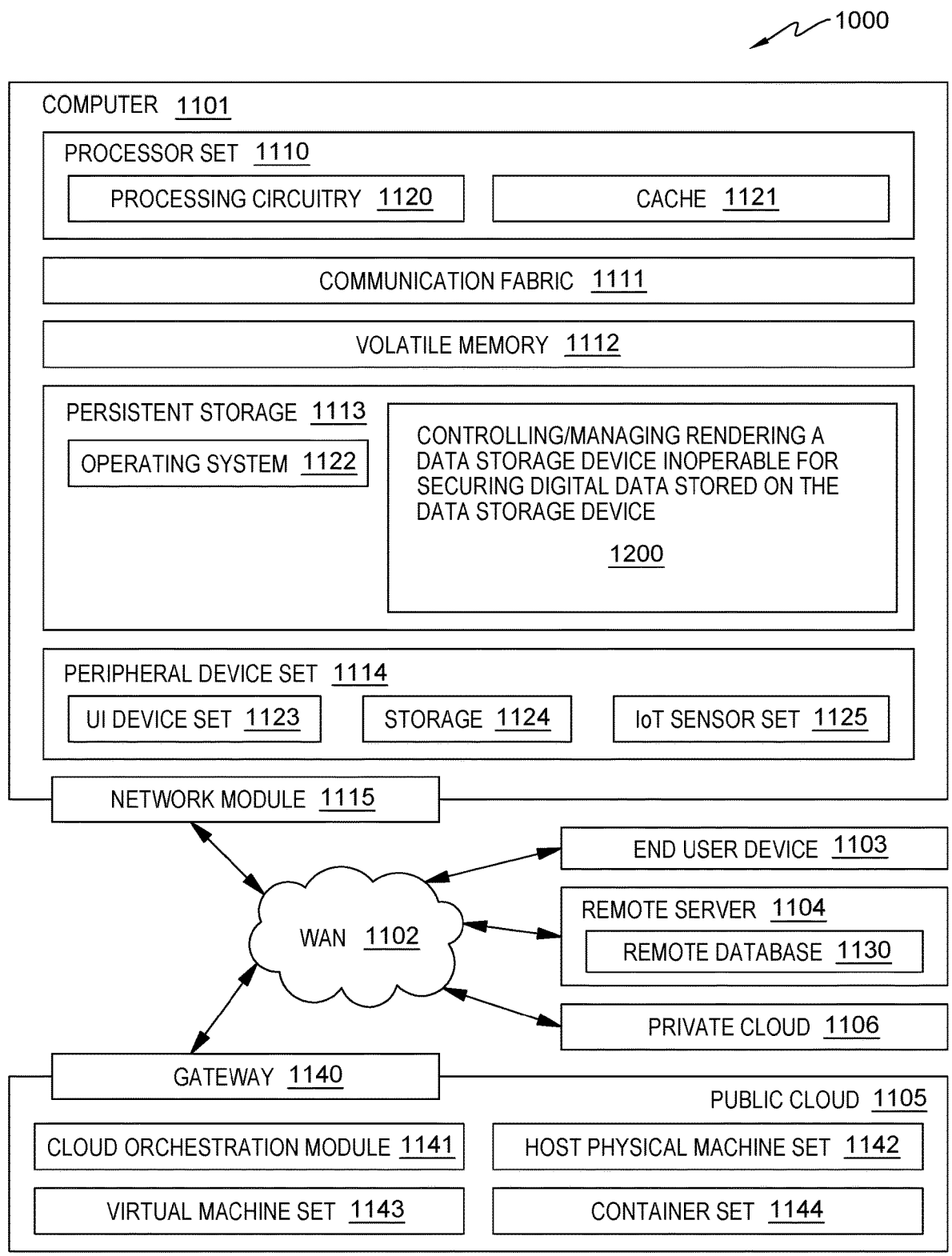
FIG. 6 is a schematic block diagram depicting a computer system according to an embodiment of the disclosure, which includes cloud computing components and functions, and which can cooperate with the systems and methods shown in the figures and described herein.

Referring to FIG. 6, a computing environment 1000 contains an example of an environment for the execution of at least some of the computer code involved in performing the inventive methods, such as managing rendering a data storage device inoperable for securing digital data stored on the data storage device 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IOT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A method for securing digital data stored on a data storage device by rendering the data storage device inoperable, comprising:
   coupling an insulating tab to a battery, the insulating tab being positioned between an electric output for the battery and a power circuit for the data storage device;
   positioning the insulating tab between the data storage device and a structure communicating with the data storage device;
   the structure being compromised to access the data storage device;
   in response to the structure being compromised to access the data storage device, the insulating tab being decoupled from the battery initiating a security mechanism, the security mechanism including an electric output at a voltage level being delivered by the battery to the data storage device via the power circuit rendering the data storage device inoperable by providing the electric output to one or more electrical components of the data storage device, wherein the voltage level of the electric output is a catastrophic voltage delivered to the data storage device to result in irreparable damage to the data storage device; and
   coupling a chassis as the structure to a bottom of a PCBA (Printed Circuit Board Assembly) where the PCBA includes the data storage device, the insulating tab and the battery being between the data storage device and the chassis.

2. The method of claim 1, wherein the power circuit is electrically communicable with the one or more electrical components of the data storage device.

3. The method of claim 1, further comprising:
   coupling the battery to the data storage device, and the battery being electrically communicable with the data storage device and the one or more electrical components, at least in part via the power circuit, for providing electrical power to the data storage.

4. The method of claim 1, wherein the power circuit electrically communicates with a power source for the data storage device and the one or more electrical components.

5. The method of claim 1, further comprising:
   coupling the data storage device to a chassis, at least in part as the structure, such that the insulating tab is between the electric output for the battery and the power circuit for the storage device.

6. The method of claim 5, further comprising:
   coupling the insulating tab to the chassis.

7. The method of claim 5, wherein the chassis encases, at least partially, the data storage device.

8. The method of claim 1, wherein the data storage device is coupled to a PCB (Printed Circuit Board).

9. The method of claim 1, further comprising:
   a computer system managing the electrical output of the battery and selectably initiating the electric output.

10. The method of claim 9, further comprising:
    detecting, at the computer system, a loss of contact between the data storage device and the structure; and
    in response to the detecting, initiating a voltage input to the data storage device at the voltage level via the power circuit.

11. The method of claim 9, further comprising:
    detecting, at the computer system, a loss of contact between a PCBA including the data storage device and a chassis as the structure; and
    in response to the detecting, initiating a voltage input to one or more electrical components of the data storage device via the power circuit at the voltage level.

12. A system for securing digital data stored on a data storage device by rendering the data storage device inoperable, comprising:
    an insulating tab coupled between an electric output for a battery and a power circuit for a data storage device;
    the insulating tab being positioned between the data storage device and a structure communicating with the data storage device, such that when the structure is compromised to access the data storage device, the insulating tab is decoupled from the battery initiating a security mechanism, the security mechanism including an electric output at a voltage level is delivered by the battery to the storage device via the power circuit rendering the data-storage device inoperable by providing the electrical output to one or more electrical components of the data storage device, wherein the voltage level of the electric output is a catastrophic voltage delivered to the data storage device to result in irreparable damage to the data storage device; and
    coupling a chassis as the structure to a bottom of a PCBA (Printed Circuit Board Assembly) where the PCBA includes the data storage device, the insulating tab and the battery being between the data storage device and the chassis.

13. The system of claim 12, further comprising:
    coupling the data storage device to a chassis, at least in part as the structure, such that the insulating tab is between the electric output for the battery and the power circuit for the storage device.

14. The system of claim 13, further comprising:
    coupling the insulating tab to the chassis.

15. The system of claim 13, wherein the chassis encases, at least partially, the data storage device.

16. The system of claim 12, wherein the data storage device is coupled to a PCB (Printed Circuit Board).

17. A system for securing digital data stored on a data storage device by rendering the data storage device inoperable, which comprises:
    a computer system comprising: a computer processor, a computer-readable storage medium, and program instructions stored on the computer-readable storage medium being executable by the processor, to cause the computer system to perform functions to:
    deliver an electric output at a voltage level to a data storage device via a power circuit, rendering the data storage device inoperable by providing the electrical output to one or more electrical components of the data storage device, in response to a structure being compromised to access the data storage device, and a loss of contact between the data storage device and the structure which communicates with the data storage device results in an insulating tab being decoupled from a battery to initiate a security mechanism which includes the electrical output; and
    wherein a chassis is coupled to the data storage device, at least in part as the structure, such that the insulating tab is positioned between the electric output for the battery and the power circuit for the storage device and the insulating tab is positioned between the data storage device and the structure, and the program instructions of the computer cause a function of the functions to remove the insulating tab; and wherein the voltage level of the electric output is a catastrophic voltage delivered to the data storage device to result in irreparable damage to the data storage device; and wherein the chassis is coupled as the structure to a bottom of a PCBA (Printed Circuit Board Assembly) where the PCBA includes the data storage device, the insulating tab and the battery being between the data storage device and the chassis.

\* \* \* \* \*